(12) United States Patent
Matsuura et al.

(10) Patent No.: US 12,442,905 B2
(45) Date of Patent: Oct. 14, 2025

(54) OBJECT DETECTION DEVICE

(71) Applicant: DENSO CORPORATION, Kariya (JP)

(72) Inventors: Mitsuyasu Matsuura, Nisshin (JP); Yu Koyama, Nisshin (JP); Taketo Harada, Kariya (JP)

(73) Assignee: DENSO CORPORATION, Kariya (JP)

( * ) Notice: Subject to any disclaimer, the term of this patent is extended or adjusted under 35 U.S.C. 154(b) by 550 days.

(21) Appl. No.: 17/092,639

(22) Filed: Nov. 9, 2020

(65) Prior Publication Data

US 2021/0055397 A1 Feb. 25, 2021

Related U.S. Application Data

(63) Continuation of application No. PCT/JP2019/017025, filed on Apr. 22, 2019.

(30) Foreign Application Priority Data

May 11, 2018 (JP) .................. 2018-092155

(51) Int. Cl.
*G01S 7/524* (2006.01)
*G01S 7/527* (2006.01)
(Continued)

(52) U.S. Cl.
CPC ............ *G01S 7/524* (2013.01); *G01S 7/5273* (2013.01); *G01S 15/04* (2013.01); *G06F 18/22* (2023.01)

(58) Field of Classification Search
None
See application file for complete search history.

(56) References Cited

U.S. PATENT DOCUMENTS 8,363,511 B2 * 1/2013 Frank ................. G01S 15/87
367/101
8,491,476 B2 * 7/2013 Iwama ................. A61B 8/00
600/443
(Continued)

FOREIGN PATENT DOCUMENTS

EP  2373434 B1  1/2014
JP  S6033073 A  2/1985
(Continued)

OTHER PUBLICATIONS

Kaminsky, Chirp Slope Keying for Underwater Communications, Proc. SPIE Sensors, and Command, Control, Communications, and Intelligence (C3I) Technologies for Homeland Security and Homeland Defense IV Conf, vol. 5778 (Year: 2005).*

*Primary Examiner* — Isam A Alsomiri
*Assistant Examiner* — Vikas Atmakuri
(74) *Attorney, Agent, or Firm* — Maschoff Brennan

(57) ABSTRACT

An object detection device includes a signal generation unit, a drive unit, an object determination unit, and a drive control unit. The signal generation unit generates at least one pulse signal that includes an identification code for identifying the ultrasonic wave. The drive unit drives the wave transceiver unit using a current or a voltage according to the at least one pulse signal. The object determination unit compares a code included in the received ultrasonic wave with the identification code and determines whether the received ultrasonic wave is a wave resulting from reflection of the ultrasonic wave transmitted by the wave transceiver unit, and determines whether an object is present in a predetermined detection range based on the amplitude of the received ultrasonic wave. The drive control unit reduces the current or the voltage used by the drive unit when a predetermined amplitude rise time has elapsed.

18 Claims, 5 Drawing Sheets

(51) Int. Cl.
    *G01S 15/04*        (2006.01)
    *G06F 18/22*        (2023.01)

(56)                References Cited

U.S. PATENT DOCUMENTS 8,854,923 B1 * 10/2014  Eyster ................... H04R 17/10
                                                      310/317
2012/0310091 A1 * 12/2012  Ohnuma ............... B06B 1/0215
                                                      600/443
2017/0110504 A1 *  4/2017  Panchawagh ......... G06F 3/0436
2017/0205783 A1 *  7/2017  Tannenbaum ......... G05B 15/02
2017/0254899 A1 *  9/2017  Fukada ................. G01S 15/04
2018/0113192 A1 *  4/2018  Bialer .................... G01S 13/42
2018/0329044 A1   11/2018  Nomura et al.
2019/0196010 A1 *  6/2019  Sugae .................. G01S 15/104
2019/0346563 A1 * 11/2019  Sugae .................. G01S 15/931
2020/0049816 A1    2/2020  Suzuki et al.
2021/0028724 A1 *  1/2021  Tajima .................. H02N 1/006

FOREIGN PATENT DOCUMENTS

JP           H01118790 A  *  5/1989
JP           H04110687 A     4/1992
JP           H04286984 A  * 10/1992
JP           H08136643 A  *  5/1996
JP            H0921869 A  *  1/1997
JP          2013-175966 A     9/2013
JP            2015025712 A  *  2/2015
JP          2019-032207 A     2/2019
WO       WO-2012077345 A1 *  6/2012  .......... G01S 15/102
WO       WO-2014097479 A1 *  6/2014  .......... G01S 15/102
WO       WO-2017141370 A1 *  8/2017

* cited by examiner

OBJECT DETECTION DEVICE

CROSS-REFERENCE TO RELATED APPLICATION

The present application is a continuation application of International Application No. PCT/JP2019/017025, filed on Apr. 22, 2019, which claims priority to Japanese Patent Application No. 2018-92155 filed on May 11, 2018. The contents of these applications are incorporated herein by reference in their entirety.

BACKGROUND

Technical Field

The present disclosure relates to an object detection device.

Background Art

In-vehicle object detection devices that detect an obstacle by transmitting and receiving ultrasonic waves is known. A technique has been proposed for the object detection device. In the technique, a frequency of a search wave signal is changed with time and a frequency of the received wave signal is compared with the frequency of the search wave signal to avoid interference with an ultrasonic wave signal transmitted from another vehicle traveling around the vehicle equipped with the object detection device.

SUMMARY

In the present disclosure, provided is an object detection device as the following. The object detection device includes: a wave transceiver unit that transmits a search ultrasonic wave and receives an ultrasonic wave having an amplitude; a signal generation unit that generates at least one pulse signal that includes an identification code for identifying the search ultrasonic wave; a drive unit that drives the wave transceiver unit using a current or a voltage according to the at least one pulse signal generated by the signal generation unit; an object determination unit that compares a code included in the received ultrasonic wave with the identification code included in the at least one pulse signal and determines whether the received ultrasonic wave is a wave resulting from reflection of the ultrasonic wave transmitted by the wave transceiver unit, and determines whether an object is present in a predetermined detection range of the object detection device based on the amplitude of the received ultrasonic wave; and a drive control unit that reduces the current or the voltage used by the drive unit for driving the wave transceiver unit when a predetermined amplitude rise time has elapsed.

DETAILED DESCRIPTION OF THE PREFERRED EMBODIMENTS

[PTL 1] EP 2373434 B, Specification

Figure 1:
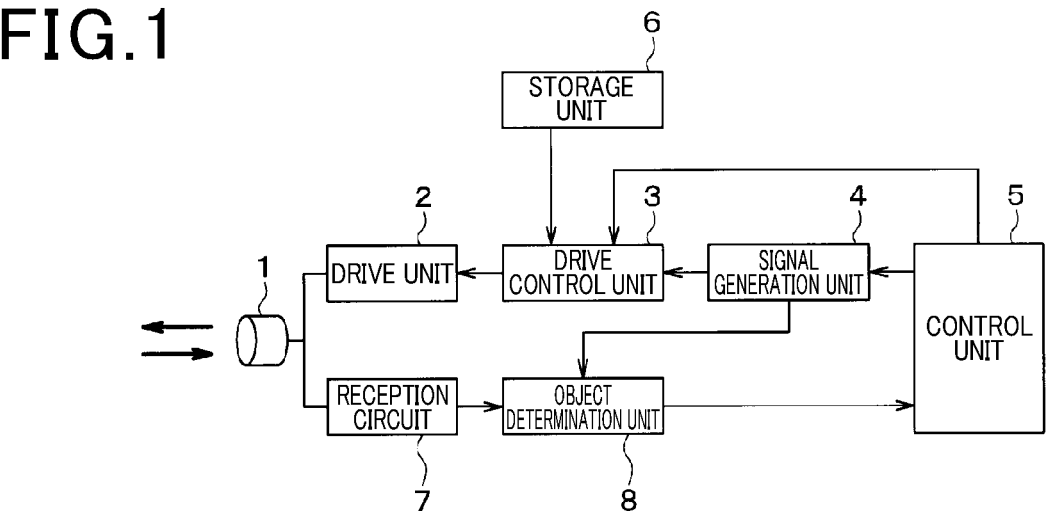
FIG. 1 is a diagram showing a configuration of an object detection device according to a first embodiment.

In the technique of Patent Literature 1, in order to avoid interference by multiple reflection and improve accuracy of identification of the received waves, time for transmitting search waves is preferably short.

However, when a resonance microphone is used as a wave transceiver unit that transmits and receives ultrasonic waves and the time for transmitting search waves is short, a change in frequency is less likely to be observed immediately after reception of reflected waves is started. This is because due to low tracking performance of the resonance microphone to an input signal, it takes time for an amplitude of the search wave signal to be increased after search wave transmission is started, and while the amplitude of the search wave signal is small, a characteristic of a frequency of the input signal is less likely to appear in the search waves.

This also applies to the case where, instead of the frequency of the search wave signal, a phase of the search wave signal is changed, and while the amplitude of the search wave signal is small, a characteristic of a phase of the input signal is less likely to appear in the search waves.

The present disclosure has been made in view of the above point, and provides, an object detection device capable of improving tracking performance of a search wave to a signal inputted to a wave transceiver unit, for example.

According to an aspect of the present disclosure, an object detection device includes: a wave transceiver unit that transmits an ultrasonic wave and receives an ultrasonic wave having an amplitude; a signal generation unit that generates at least one pulse signal that includes an identification code for identifying the ultrasonic wave; a drive unit that drives the wave transceiver unit using a current or a voltage according to the at least one pulse signal generated by the signal generation unit; an object determination unit that compares a code included in the received ultrasonic wave with the identification code included in the at least one pulse signal and determines whether the received ultrasonic wave is a wave resulting from reflection of the ultrasonic wave transmitted by the wave transceiver unit, and determines whether an object is present in a predetermined detection range of the object detection device based on the amplitude of the received ultrasonic wave; and a drive control unit that reduces the current or the voltage used by the drive unit for driving the wave transceiver unit when a predetermined amplitude rise time has elapsed.

According to this, since during the amplitude rise time, the current or the voltage inputted to the wave transceiver unit is large, tracking performance of a search wave signal to the pulse signal can be improved.

A reference numeral in parentheses given to each component or the like merely represents an example of a correspondence relationship between the component or the like and a specific configuration or the like in embodiments described later. Thus, the present disclosure is not limited by the reference numerals.

Embodiments of the present disclosure will be described below with reference to the drawings. In the following description of the embodiments, portions identical or equivalent to each other are given the same reference numerals.

First Embodiment

A first embodiment will be described. An object detection device of the present embodiment is an ultrasonic sonar device, and is mounted on a vehicle and detects an object outside the vehicle.

As shown in FIG. 1, the object detection device includes a microphone 1, a drive unit 2, a drive control unit 3, a signal generation unit 4, a control unit 5, a storage unit 6, a reception circuit 7, and an object determination unit 8.

The control unit 5, the object determination unit 8, and the like are composed of a well-known microcomputer including a CPU, a ROM, a RAM, an I/O, and the like, and perform processes such as various arithmetic operations according to a program stored in the ROM or the like. The ROM and the RAM are a non-transitory tangible storage medium.

The microphone 1 transmits and receives ultrasonic waves, and outputs signals corresponding to the received waves. The microphone 1 corresponds to a wave transceiver unit. The microphone 1 is arranged to face an outer surface of the vehicle, and transmits a search wave signal for detecting an object toward the outside of the vehicle. Specifically, the microphone 1 includes a piezoelectric element (not shown) in which a piezoelectric layer is arranged between two electrodes facing each other. The two electrodes are connected to the drive unit 2. When an alternating current or an alternating voltage is supplied from the drive unit 2 to the two electrodes and the piezoelectric layer is deformed, search ultrasonic wave signal is transmitted from the microphone 1 to the outside of the vehicle.

The drive unit 2 applies a drive current or a drive voltage to the microphone 1 according to a pulse signal inputted from the drive control unit 3. The pulse signal inputted to the drive unit 2 is generated by the signal generation unit 4. In the present embodiment, the drive control unit 3 is arranged between the drive unit 2 and the signal generation unit 4, and the pulse signal generated by the signal generation unit 4 is inputted to the drive unit 2 via the drive control unit 3.

The drive control unit 3 controls the drive current or the drive voltage applied to the microphone 1. The drive control unit 3 adjusts the amplitude of the pulse signal generated by the signal generation unit 4 so that the drive current or the drive voltage applied to the microphone 1 has a desired value, and then the drive control unit 3 inputs the pulse signal to the drive unit 2. When a predetermined amplitude rise time has elapsed, the drive control unit 3 reduces the current or the voltage inputted from the drive unit 2 to the microphone 1.

The signal generation unit 4 generates a pulse signal according to a wave transmission instruction from the control unit 5 so that the pulse signal includes an ultrasonic wave identification code. The code is used to identify a reflected wave signal of the search wave signal transmitted from the microphone 1 and an ultrasonic wave signal transmitted from another object detection device, or the like. Identification of the received wave signal using the code enables avoidance of interference with an ultrasonic wave signal transmitted from another device and simultaneous measurement by a plurality of microphones, and allows higher reliability of the measurement and a shorter measurement cycle.

In the present embodiment, the identification code is represented by a pattern of frequency, and the signal generation unit 4 generates a pulse signal including a chirp signal in which a frequency thereof changes in a predetermined pattern with time. Thus, an ultrasonic wave signal including the chirp signal is transmitted as a search wave signal from the microphone 1. The amplitude of the pulse signal generated by the signal generation unit 4 is constant.

As the chirp signal, an up-chirp signal representing a code "0" and a down-chirp signal representing a code "1" are used. The up-chirp signal is a signal in which a frequency increases as time passes, and the down-chirp signal is a signal in which a frequency decreases as time passes.

For example, when a 2-bit code "01" is used as the identification code, a pulse signal is generated in the order of an up-chirp signal and a down-chirp signal. When a code "10" is used as the identification code, a pulse signal is generated in the order of a down-chirp signal and an up-chirp signal.

The drive control unit 3 changes, for each code, the current or the voltage inputted from the drive unit 2 to the microphone 1. A drive current and a drive voltage suitable for increasing an amplitude of the search wave signal vary according to an individual difference of the microphone and according to whether the chirp signal is an up-chirp signal or a down-chirp signal. Both the drive current or the drive voltage for the up-chirp signals and the drive current or the drive voltage for the down-chirp signals are set in consideration of an individual difference of the microphone 1 and stored in the storage unit 6. The storage unit 6 is a non-transitory tangible storage medium. For example, during manufacture of an object detection device, a sound pressure of a search wave signal is measured at a position a predetermined distance away from the microphone 1, and the drive current or the like is set so that the sound pressure has a desired value.

The two electrodes of the piezoelectric element of the microphone 1 are also connected to the reception circuit 7. When the microphone 1 receives an ultrasonic wave signal, the piezoelectric layer is deformed and a voltage is generated between the two electrodes, and the voltage is inputted to the reception circuit 7.

The reception circuit 7 performs a process such as A/D conversion, amplification, or filtering for an output signal from the microphone 1, and a signal generated by the reception circuit 7 is outputted to the object determination unit 8.

The object determination unit 8 compares a code included in the received wave signal with the code included in the pulse signal, and determines whether the received wave signal is a reflected wave signal of the search wave signal transmitted from the microphone 1. Furthermore, the object determination unit 8 determines whether an object is present in a detection range on the basis of an amplitude of the received wave signal.

Specifically, the object determination unit 8 mixes the output signal from the reception circuit 7 with the pulse signal generated by the signal generation unit 4, and extracts information such as a frequency or an amplitude of the received wave signal from the output signal from the reception circuit 7. From the extracted information, the object determination unit 8 generates a frequency waveform and an amplitude waveform. From the frequency waveform, the object determination unit 8 detects a code and identifies the received wave signal, and from the amplitude waveform, the object determination unit 8 calculates a propagation time of the ultrasonic wave signal and detects an object.

For example, in a case where a pulse signal including the code "0" is generated by the signal generation unit 4, when the up-chirp signal representing the code "0" is detected from the frequency waveform of the received wave signal, the object determination unit 8 determines that the received wave signal is a reflected wave signal of the search wave signal transmitted from the microphone 1.

Figure 2:
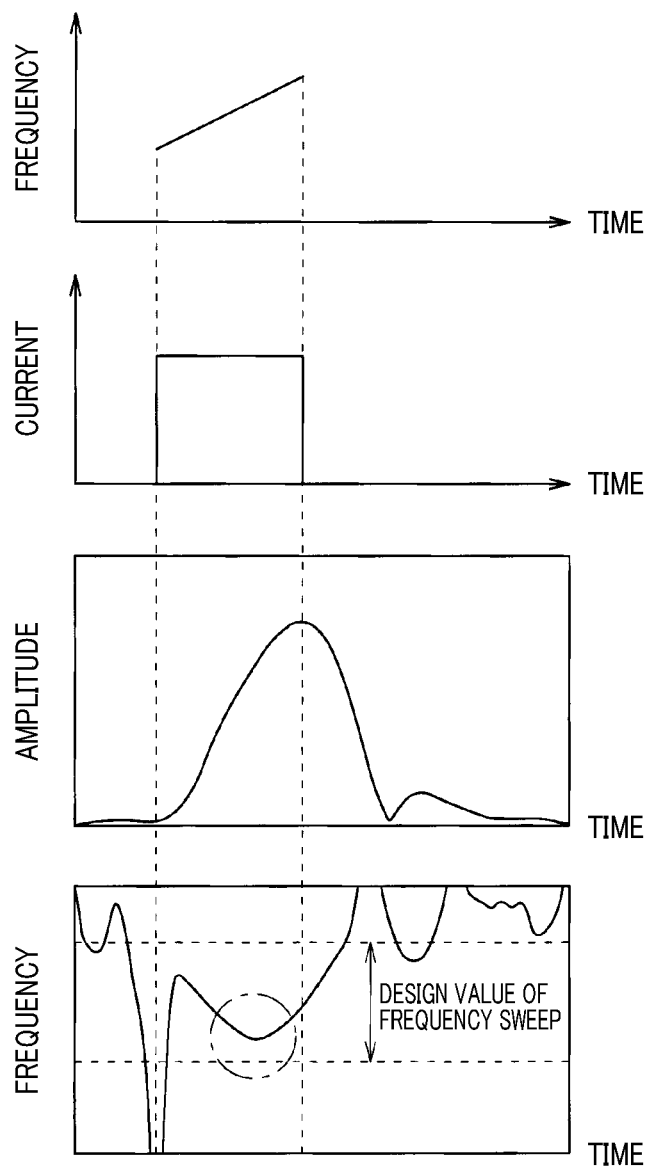
FIG. 2 is a diagram showing a frequency of a pulse signal, a drive current, and an amplitude and a frequency of a received wave of a comparative example of the first embodiment.
Figure 4:
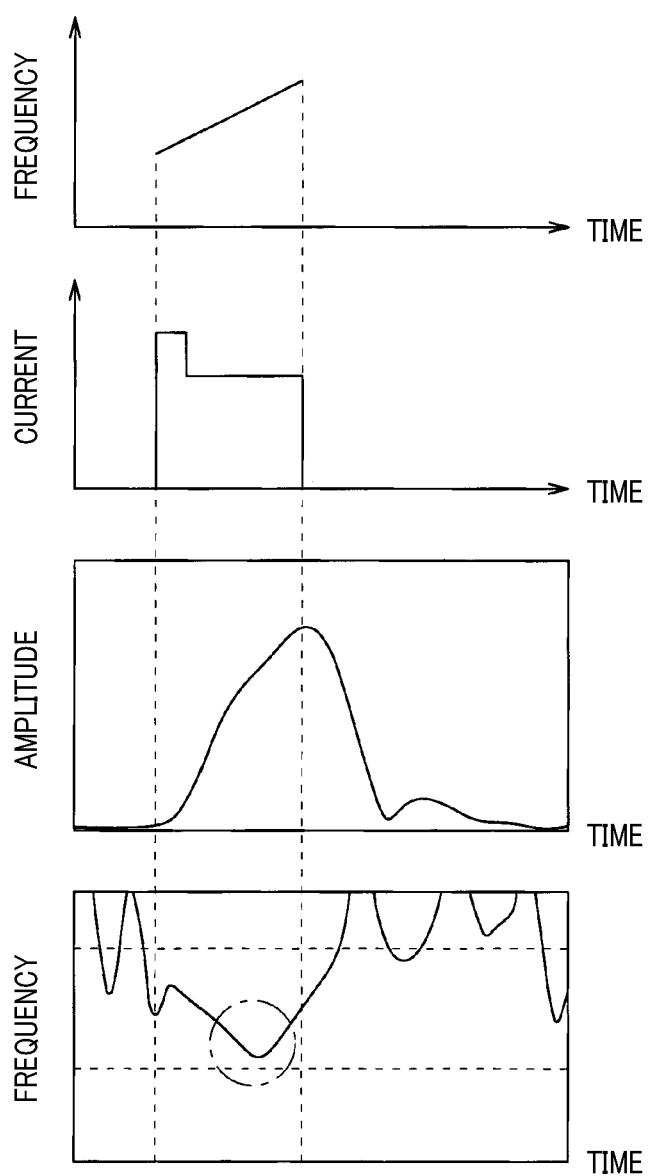
FIG. 4 is a diagram showing a frequency of a pulse signal, a drive current, and an amplitude and a frequency of a received wave signal of the first embodiment.

For example, the object determination unit 8 compares the frequency waveform of the received wave signal with a predetermined reference waveform to detect a code. Due to low tracking performance of the microphone 1 to an input signal, a difference in frequency occurs between the pulse signal generated by the signal generation unit 4 and a signal outputted from the microphone 1 when a reflected wave signal of the search wave signal is received by the microphone 1. Specifically, when a reflected wave signal of the search wave signal is received by the microphone 1, as time passes, the frequency of the output signal from the microphone 1 changes in a direction opposite to that of the frequency of the pulse signal or changes more slowly than the frequency of the pulse signal, and then the frequency of the output signal from the microphone 1 changes in the same manner as the frequency of the pulse signal. Thus, the reference waveform used by the object determination unit 8 to detect a code changes as described above. FIGS. 2 and 4 (described later) show a case where when a reflected wave signal of the search wave signal is received, the frequency of the output signal from the microphone 1 is changed in a V shape.

When the object determination unit 8 determines that the received wave signal is a reflected wave signal of the search wave signal, the object determination unit 8 compares the amplitude of the received wave signal with a predetermined threshold, and on the basis of a time from when the search wave signal is transmitted from the microphone 1 to when the amplitude of the received wave signal becomes the threshold or more, the object determination unit 8 calculates a distance from an object by which the search wave signal has been reflected. The object determination unit 8 determines whether the object is present in the detection range on the basis of the calculated distance. A result of the determination by the object determination unit 8 is transmitted to the control unit 5, and the control unit 5 performs a notification to the driver or the like according to the result of the determination by the object determination unit 8.

Operation of the object detection device will be described. When the resonance microphone 1 including the piezoelectric element is used as the wave transceiver unit, due to the low tracking performance of the microphone 1 to an input signal from the drive unit 2, it takes time for the amplitude of the search wave signal to be increased after search wave signal transmission is started. While the amplitude of the search wave signal is small, a characteristic of a frequency of the input signal is less likely to appear in the search waves. Thus, for example, as shown in FIG. 2, when a drive current or a drive voltage having a constant amplitude is inputted to the microphone 1 and a search wave signal is transmitted, immediately after reception of a reflected wave signal is started, a change in frequency of the received wave signal is less likely to be observed. A portion of a frequency waveform of the received wave signal surrounded by a dot-dash line in FIG. 2 corresponds to a portion of a pulse signal including the up-chirp signal at which a frequency sweep is started, and a frequency of the portion surrounded by the dot-dash line is higher than a design lower limit value of the frequency sweep. Accordingly, the change in the frequency of the received wave signal is small, and a code is difficult to detect.

Thus, in the present embodiment, until the amplitude of the search wave signal rises, the amplitude of the drive current or the drive voltage of the microphone 1 is increased so that a change in frequency appears immediately after reception of a reflected wave signal is started. Specifically, the object detection device of the present embodiment transmits a search wave signal by a process shown in FIG. 3.

At step S1, the signal generation unit 4 generates a pulse signal so that the pulse signal includes an ultrasonic wave identification code. In the object detection device, control proceeds from step S1 to step S2, and at step S2, the drive control unit 3 determines whether it is before the predetermined amplitude rise time has elapsed.

The amplitude rise time is set to include at least part of the time from the amplitude of the search wave signal is smaller than a predetermined value until the amplitude of the search wave signal exceeds the predetermined value and the rise of the amplitude is ended. Specifically, the amplitude rise time is set, for example, to a predetermined time from when generation of a pulse signal is started. For example, when a code of 2 or more bits is used, the amplitude rise time is set to a predetermined time from when generation of a pulse signal representing a single code is started, and the drive current or the like after switching of the code is larger than before the switching of the code.

In the object detection device, when the drive control unit 3 determines that the amplitude rise time has not yet elapsed, control proceeds to step S3, and when the drive control unit 3 determines that the amplitude rise time has elapsed, control proceeds to step S4.

At step S3, the drive control unit 3 inputs the drive current or the drive voltage larger than a predetermined value to the microphone 1. Thus, the amplitude of the search wave signal transmitted from the microphone 1 is larger than when the drive current or the drive voltage of the predetermined value or less is inputted to the microphone 1. At step S4, the drive control unit 3 inputs the drive current or the drive voltage of the predetermined value or less to the microphone 1. Thus, when the amplitude rise time has elapsed, the drive control unit 3 reduces the current or the voltage inputted from the drive unit 2 to the microphone 1.

In the object detection device, control proceeds from step S3 or step S4 to step S5, and at step S5, the control unit 5 determines whether a search wave signal corresponding to a predetermined number of pulses has been transmitted. In the object detection device, when the control unit 5 determines that the search wave signal corresponding to the predetermined number of pulses has been transmitted, the process of transmitting a search wave signal is ended, and when the control unit 5 determines that the search wave signal corresponding to the predetermined number of pulses has not been transmitted, control proceeds to step S1.

Figure 3:
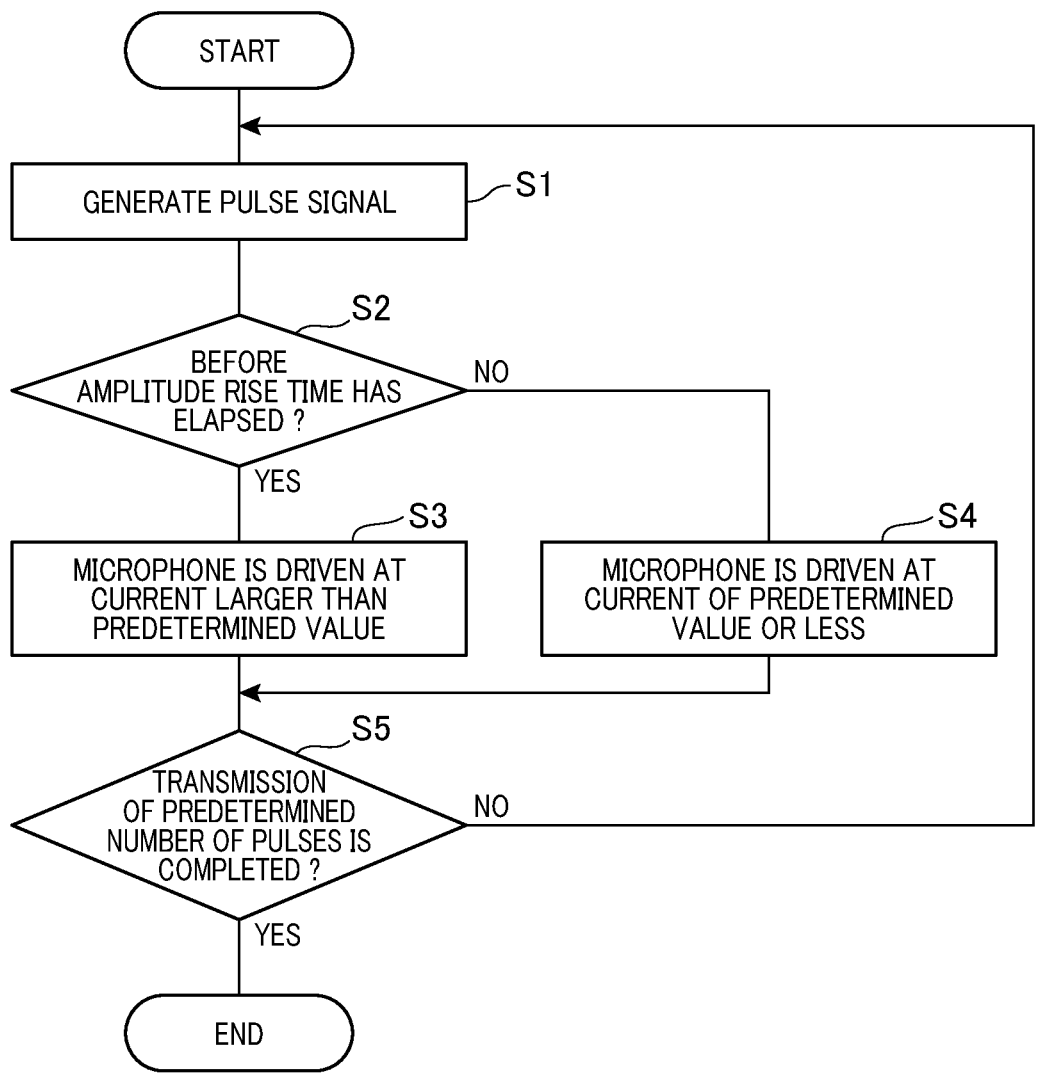
FIG. 3 is a flow chart of a process performed by the object detection device.

By the process shown in FIG. 3, in the present embodiment, as shown in FIG. 4, until a predetermined time has elapsed from when generation of a pulse signal is started, the drive current or the drive voltage of the microphone 1 is larger than after the predetermined time has elapsed. Thus, during the amplitude rise time, tracking performance of a search wave signal to the pulse signal is improved, and a change in the frequency of the received wave signal is more likely to be observed. In a portion surrounded by a dot-dash line in FIG. 4, the frequency of the received wave signal is closer to the design lower limit value of the frequency sweep than in FIG. 2, leading to a larger change in the frequency of the received wave signal.

If a large drive current or drive voltage is always applied to the microphone 1, a characteristic of the frequency of the received wave signal is more likely to be observed, but a transmission sound pressure is excessively high. The drive control unit 3 is provided with a capacitor that stores electric charge to drive the microphone 1. When a search wave signal including a long code sequence is transmitted and a large drive current or the like is always applied to the microphone 1, the electric charge stored in the capacitor is expended. Thus, in the present embodiment, the drive current or the like applied to the microphone 1 is increased only during the amplitude rise time, and after the amplitude rise time has elapsed, the drive current or the like is reduced.

Second Embodiment

A second embodiment will be described. The present embodiment is an embodiment obtained by changing the frequency of the pulse signals of the first embodiment, and the rest is the same as in the first embodiment. Thus, only differences from the first embodiment will be described.

Figure 5:
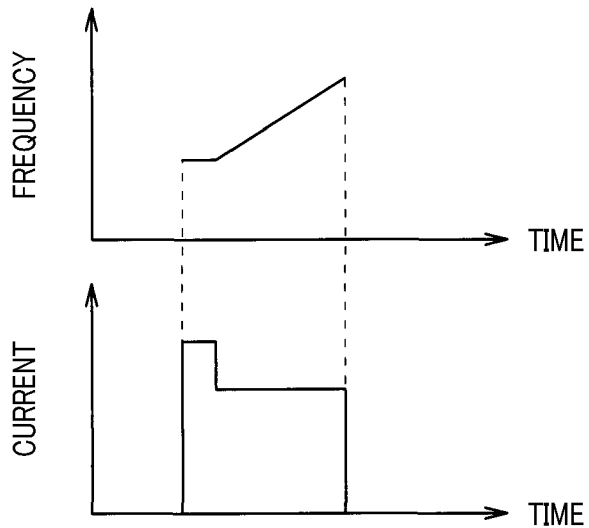
FIG. 5 is a diagram showing a frequency of a pulse signal and a drive current of a second embodiment.

As shown in FIG. 5, in the present embodiment, after the signal generation unit 4 generates a pulse signal having a constant frequency for a predetermined number of pulses, the signal generation unit 4 changes the frequency of the pulse signal. When generation of a pulse signal is started, the pulse signal has a frequency in the vicinity of the resonance frequency of the microphone 1. The drive control unit 3 controls the drive current or the like so that while the pulse signal has a constant frequency, the drive current or the like is larger than a predetermined value, and after a frequency sweep is started, the drive current or the like is the predetermined value or less.

Thus, since the microphone 1 is driven at the frequency in the vicinity of the resonance frequency and then the frequency of the pulse signal is swept, the amplitude at the start of the sweep is increased and a change in the frequency of the pulse signal is more likely to appear in the received wave signal. Furthermore, since the drive current or the like before the frequency sweep is larger than the predetermined value, an even larger change in the frequency appears in the received waves.

The present embodiment can be configured to transmit a search wave signal, which includes a code comprised of at least two bits, based on at least first and second pulse signals, each of the first and second pulse signals having a swept frequency that represents a corresponding one of the at least two bits of the code. In this configuration, the amplitude rise time is set to, for example, a predetermined time from the end of the first pulse signal.

Third Embodiment

A third embodiment will be described. The present embodiment is an embodiment obtained by changing the method of representing the code of the first embodiment, and the rest is the same as in the first embodiment. Thus, only differences from the first embodiment will be described.

In the present embodiment, the pulse signal has a constant frequency, and the ultrasonic wave identification code is represented by a phase. Specifically, a signal having a phase of 0° represents the code 0, and a signal having a phase of 180° represents the code 1.

Figure 6:
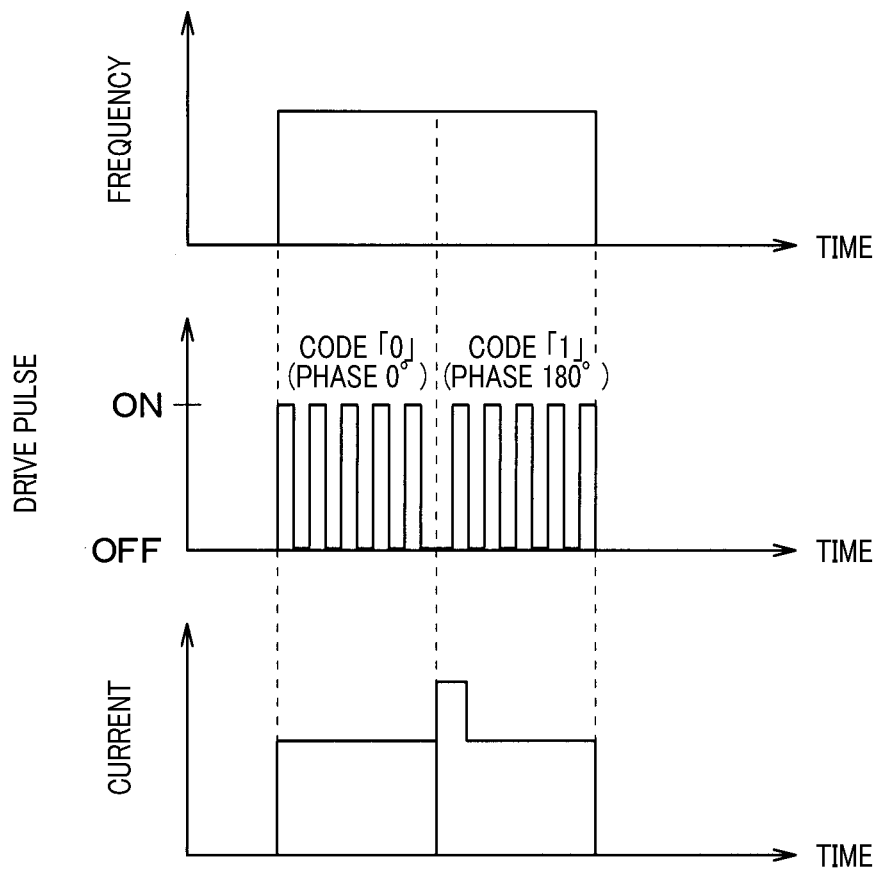
FIG. 6 is a diagram showing a pulse signal and a drive current of a third embodiment.

For example, when the 2-bit code 01 is used as the identification code, as shown in FIG. 6, after a pulse signal having the phase of 0° is generated for a predetermined number of pulses, a pulse signal having the phase of 180° is generated for a predetermined number of pulses. In the present embodiment, the amplitude rise time is set to a predetermined time from when the phase of the pulse signal is discontinuously changed in this manner, and during the amplitude rise time, the drive control unit 3 causes the drive current or the like to be larger than a predetermined value. Before switching of the code after generation of a pulse signal is started, and after the amplitude rise time has elapsed, the drive control unit 3 causes the drive current or the like to be the predetermined value or less.

The object determination unit 8 extracts phase information from the output of the reception circuit 7, and compares the code detected from the phase of the received wave signal with the code included in the pulse signal. When these codes match, the object determination unit 8 determines that the received wave signal is a reflected wave signal of the search wave signal transmitted from the microphone 1.

When the code is represented by the phase as described above, in some cases, during switching of the bit, the phase of the pulse signal is discontinuously changed. At this time, due to the low tracking performance of the microphone 1, the amplitude of the search wave signal after switching of the phase is smaller than before the switching of the phase.

In this regard, since during the amplitude rise time, the drive current or the like of the microphone 1 is larger than the predetermined value, the amplitude of the received wave signal after the switching of the code is large and the phase of the received wave signal is easy to detect.

Figure 7:
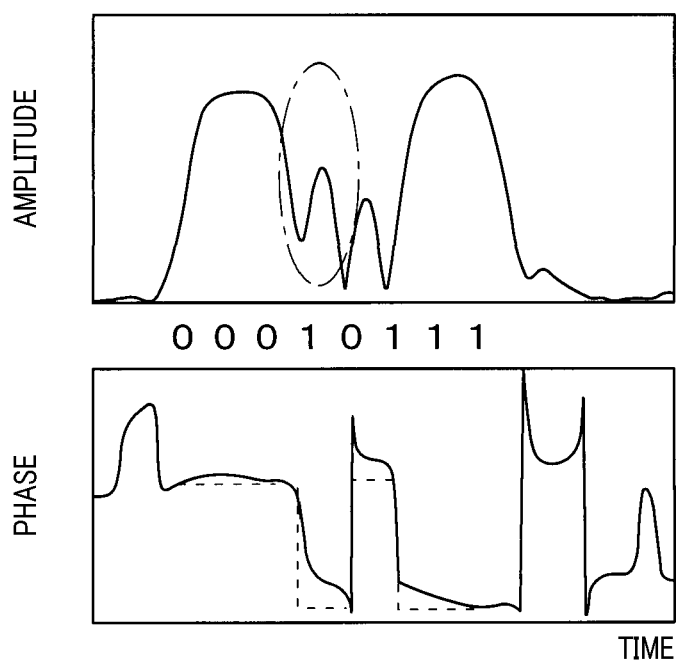
FIG. 7 is a diagram showing an amplitude and a phase of a received wave signal of a comparative example of the third embodiment.

For example, when a 8-bit code 00010111 is used as the identification code, if the drive current or the like is always the predetermined value or less, as shown in FIG. 7, after switching of the bit, the amplitude of the received wave signal is reduced. Specifically, as in a portion surrounded by a dot-dash line, after the code included in the received wave signal is switched from the third-bit code 0 to the fourth-bit code "1", the amplitude of the received wave signal is reduced. Thus, the fourth-bit code 1 is difficult to detect.

Figure 8:
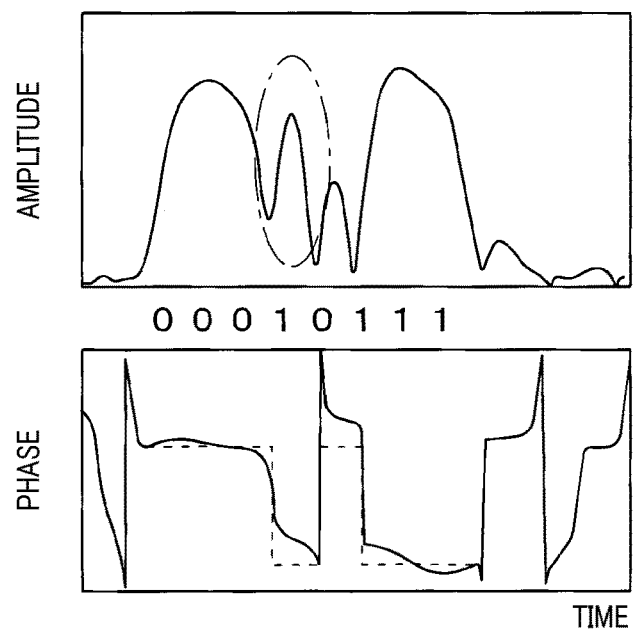
FIG. 8 is a diagram showing an amplitude and a phase of a received wave signal of the third embodiment.

In this regard, when the drive current or the like is caused to be larger than the predetermined value for a predetermined time after the code included in the search wave signal is switched from the third-bit code 0 to the fourth-bit code 1, as shown in FIG. 8, the amplitude of the received wave signal is increased. Thus, the fourth-bit code "1" is easy to detect. In FIGS. 7 and 8, a dashed line in a graph of the phase indicates the phase of the pulse signal.

FIG. 8 shows a case where the drive current or the like is increased for the fourth-bit code. Similarly, when the drive current or the like after the switching of the code is increased for the fifth-bit code or the sixth-bit code, the code is also easy to detect.

Other Embodiments

The present disclosure is not limited to the embodiments described above, and may be changed as appropriate.

Figure 9:
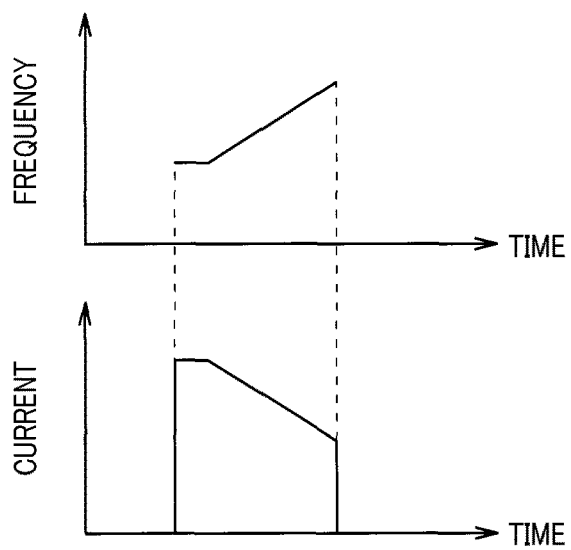
FIG. 9 is a diagram showing a frequency of a pulse signal and a drive current of another embodiment.
Figure 10:
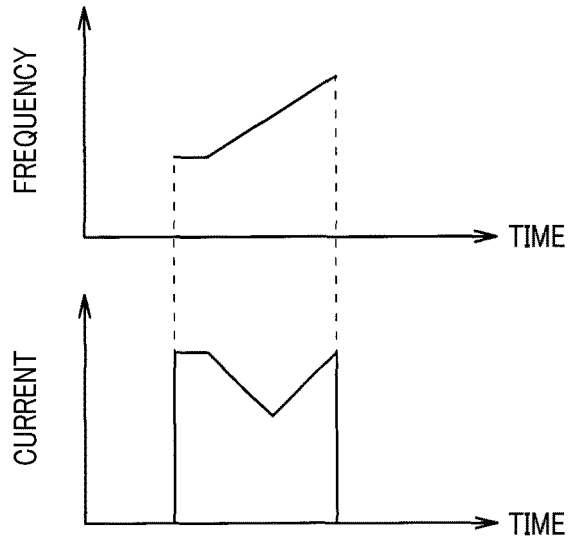
FIG. 10 is a diagram showing a frequency of a pulse signal and a drive current of another embodiment.

For example, in the second embodiment, as shown in FIG. 9, after the amplitude rise time has elapsed, the drive current or the like may be gradually reduced. Alternatively, as shown in FIG. 10, after the amplitude rise time has elapsed, the drive current or the like may be gradually reduced and then increased. The resonance microphone 1 has a characteristic in which the amplitude has a peak at the resonance frequency and the amplitude is reduced as the frequency is farther from the resonance frequency. Thus, in the example shown in FIG. 10, when the frequency of the pulse signal is swept around the resonance frequency of the microphone 1 and the drive current or the like is changed as described above, it is possible to correct the characteristic of the microphone 1 and reduce the change in the amplitude of the search wave signal. Furthermore, in the first embodiment, the drive current or the like may be changed as shown in FIGS. 9 and 10.

The drive control unit 3 may control the current or the voltage inputted from the drive unit 2 to the microphone 1 so that a change in the characteristic of the microphone 1 or the like is corrected. In a situation where the performance of the object detection device is deteriorated, an increase in the drive current or the like improves robustness against an environmental change.

For example, the drive current or the drive voltage may be controlled according to a temperature characteristic of the microphone 1. Alternatively, the drive current or the drive voltage may be controlled according to a detection target distance in consideration of attenuation of the reflected waves due to a distance from the object. For example, the drive current or the like may be increased as the detection target distance is increased. Alternatively, the drive current or the drive voltage may be controlled according to an environmental temperature. As the environmental temperature is increased, the distance attenuation of the reflected waves is increased, and as the environmental temperature is reduced, the distance attenuation of the reflected waves is reduced. Thus, for example, the drive current or the like may be increased as the environmental temperature is increased. Alternatively, the drive current or the drive voltage may be controlled according to a relative speed of the object with respect to the microphone 1. As the relative speed with respect to the object is increased, the shift amount in frequency of the reflected wave signal to the search wave signal is increased. Thus, for example, the drive current or the like may be increased in proportion to the relative speed so that a change in the frequency is easy to detect.

In the first and second embodiments, when a code of two or more bits is used to generate a pulse signal including the same consecutive codes, during switching of the bit, the frequency of the pulse signal is discontinuously changed. In this case, the amplitude rise time may be set to a predetermined time from when the frequency of the pulse signal is discontinuously changed. When the frequency of the pulse signal is discontinuously changed in this manner or when, as in the third embodiment, the phase of the pulse signal is discontinuously changed, the drive current or the like may be controlled so that the drive current or the like is not changed during the switching of the bit, and the drive current or the like is increased only when generation of a pulse signal is started.

A microphone 1 for transmitting ultrasonic waves and a microphone 1 for receiving ultrasonic waves may be arranged so that the two microphones 1 constitute the wave transceiver unit. The present disclosure may be applied to an object detection device mounted on something other than a vehicle.

What is claimed is:

1. An object detection device comprising:
a wave transceiver unit configured to transmit a search ultrasonic wave and receive an ultrasonic wave having an amplitude, the search ultrasonic wave including at least one pulse signal;
a signal generation unit configured to generate the at least one pulse signal, the at least one pulse signal including at least one identification code for identifying the search ultrasonic wave, the at least one identification code being comprised of a frequency change;
a drive control unit configured to receive the at least one pulse signal from the signal generation unit and generate a drive current or a drive voltage, the drive control unit configured to adjust an amplitude of the at least one pulse signal using the drive current or the drive voltage;
a drive unit configured to apply the drive current or the drive voltage to the wave transceiver unit to generate the at least one pulse signal; and
an object determination unit configured to compare a code included in the received ultrasonic wave with the at least one identification code included in the at least one pulse signal to determine whether the received ultrasonic wave is a wave resulting from reflection of the search ultrasonic wave, the object determination unit configured to determine whether an object is present in a predetermined detection range of the object detection device based on the amplitude of the received ultrasonic wave,
wherein
the drive control unit is configured to:
increase, during a predetermined amplitude rise time, at least one of the drive current and the drive voltage from a predetermined value to be larger than the predetermined value, the predetermined amplitude rise time comprising a predetermined time from a start of a generating of a pulse signal representing a code of one bit, the code of one bit comprising one bit of the at least one identification code, in which an up-chirp signal represents a code "0" and a down-chirp signal represents a code "1", the up-chirp signal comprising a signal in which a frequency increases as time passes, and the down-chirp signal comprising a signal in which a frequency decreases as time passes;
reduce, during the predetermined amplitude rise time, the at least one of the drive current and the drive voltage to the predetermined value before the predetermined amplitude rise time has elapses; and
reduce the at least one of the drive current and the drive voltage to be equal to or less than the predetermined value in response to determining that the predetermined amplitude rise time has elapsed, wherein
during the predetermined amplitude rise time, the at least one pulse signal comprises a constant frequency for a predetermined number of pulses and thereafter changes in frequency after the predetermined number of pulses.

2. The object detection device according to claim 1, wherein an elapse of the predetermined amplitude rise time is an elapse of one of:
a first predetermined time since when generation of the at least one pulse signal is started,
a second predetermined time since when a frequency or a phase of the at least one pulse signal is discontinuously changed,
a third predetermined time since when generation of the at least one pulse signal is started, and
in response to the at least one pulse signal being comprised of successive first and second pulse signals representing the code, a fourth predetermined time since an end of the first pulse signal.

3. The object detection device according to claim 1, wherein
the at least one identification code comprises at least first and second identification codes,
the signal generation unit is configured to generate the at least one pulse signal that includes an up-chirp signal and a down-chirp signal, the up-chirp signal having a first frequency that increases over time and representing the first identification code, the down-chirp signal having a second frequency that decreases over time and representing the second identification code, and
the drive control unit is configured to change, for each of the first and second identification codes, the drive current or the drive voltage used by the drive unit for driving the wave transceiver unit.

4. The object detection device according to claim 3, further comprising a storage unit that stores a value of the current or the voltage used by the drive unit for the first identification code represented by the up-chirp signal, and a value of the current or the voltage used by the drive unit for the second identification code represented by the down-chirp signal.

5. The object detection device according to claim 4, wherein
the at least one identification code comprises at least successive first and second identification codes,
the signal generation unit is configured to generate the at least one pulse signal that includes the at least successive first and second identification codes, and
the drive control unit is configured to change the drive current or the drive voltage used by the drive unit for driving the wave transceiver unit, which has a first value before one of the first identification code and the second identification code is switched to the other thereof, to a second value after one of the first identification code and the second identification code is switched to the other thereof, the second value being larger than the first value.

6. The object detection device according to claim 4, wherein the drive control unit is configured to control the drive current or the drive voltage used by the drive unit for driving the wave transceiver unit to correct a change in a characteristic of the wave transceiver unit.

7. The object detection device according to claim 1, wherein
the at least one identification code comprises at least successive first and second identification codes,
the signal generation unit generates the at least one pulse signal that includes the at least successive first and second identification codes, and
the drive control unit changes the drive current or the drive voltage used by the drive unit for driving the wave transceiver unit, which has a first value before one of the first identification code and the second identification code is switched to the other thereof, to a second value after one of the first identification code and the second identification code is switched to the other thereof, the second value being larger than the first value.

8. The object detection device according to claim 7, wherein the drive control unit is configured to control the drive current or the drive voltage used by the drive unit for driving the wave transceiver unit to correct a change in a characteristic of the wave transceiver unit.

9. The object detection device according to claim 1, wherein the drive control unit is configured to control the drive current or the drive voltage used by the drive unit for driving the wave transceiver unit to correct a change in a characteristic of the wave transceiver unit.

10. The object detection device according to claim 9, wherein the drive control unit is configured to control the drive current or the drive voltage used by the drive unit for driving the wave transceiver unit in accordance with a temperature characteristic of the wave transceiver unit.

11. The object detection device according to claim 9, wherein the drive control unit is configured to control the drive current or the drive voltage used by the drive unit for driving the wave transceiver unit in accordance with a distance of the object.

12. The object detection device according to claim 9, wherein the drive control unit is configured to control the drive current or the drive voltage used by the drive unit for driving the wave transceiver unit in accordance with an environmental temperature around the object detection device.

13. The object detection device according to claim 9, wherein the drive control unit is configured to control the drive current or the drive voltage used by the drive unit for driving the wave transceiver unit in accordance with a relative speed of the object with respect to the wave transceiver unit.

14. An object detection device comprising:
a wave transceiver unit configured to transmit a search ultrasonic wave and receive an ultrasonic wave having an amplitude and a frequency;
a signal generation unit configured to generate at least one pulse signal, the at least one pulse signal including at least one identification code for identifying the search ultrasonic wave, the at least one identification code being comprised of a frequency change;
a drive control unit configured to receive the at least one pulse signal from the signal generation unit and generate a drive current or a drive voltage, the drive control unit configured to adjust an amplitude of the at least one pulse signal using the drive current or the drive voltage;
a drive unit configured to apply the drive current or the drive voltage to the wave transceiver unit to generate the at least one pulse signal; and
an object determination unit configured to compare a code included in the ultrasonic wave received by the wave transceiver unit with the at least one identification code included in the at least one pulse signal to determine whether the ultrasonic wave received by the wave transceiver unit is a wave resulting from reflection of the search ultrasonic wave, the object determination unit configured to determine whether an object is present in a predetermined detection range of the object detection device based on the amplitude of the received ultrasonic wave;
wherein
the drive control unit is configured to:
increase, during a predetermined amplitude rise time, at least one of the drive current and the drive voltage from a predetermined value to be larger than a predetermined value, the predetermined amplitude rise time comprising a predetermined time from a start of a generating of a pulse signal representing the code, the code comprising one bit of the at least one identification code, in which an up-chirp signal represents a code "0" and a down-chirp signal represents a code "1", the up-chirp signal comprising a signal in which a frequency increases as time passes, and the down-chirp signal comprising a signal in which a frequency decreases as time passes;

reduce, during the predetermined amplitude rise time, the at least one of the drive current and the drive voltage to the predetermined value before the predetermined amplitude rise time has elapsed; and reduce the at least one of the drive current and the drive voltage to be equal to or less than the predetermined value in response to determining that the predetermined amplitude rise time has elapsed, wherein the received ultrasonic wave comprises a change in frequency upon reception of the reflected ultrasonic wave by the wave transceiver unit.

15. The object detection device according to claim 14, wherein the signal generation unit is configured to generate the at least one pulse signal having the frequency being constant and having a predetermined number of pulses, and thereafter change the frequency of the at least one pulse signal.

16. The object detection device according to claim 14, wherein the at least one identification code comprises at least first and second identification codes, the signal generation unit is configured to generate the at least one pulse signal that includes an up-chirp signal and a down-chirp signal, the up-chirp signal having a first frequency that increases over time and representing the first identification code, the down-chirp signal having a second frequency that decreases over time and representing the second identification code, and the drive control unit is configured to change, for each of the first and second identification codes, the drive current or the drive voltage used by the drive unit for driving the wave transceiver unit.

17. The object detection device according to claim 14, wherein, the at least one identification code comprises at least successive first and second identification codes, the signal generation unit is configured to generate the at least one pulse signal that includes the at least successive first and second identification codes, and the drive control unit is configured to change the drive current or the drive voltage used by the drive unit for driving the wave transceiver unit, which has a first value before one of the first identification code and the second identification code is switched to the other thereof, to a second value after one of the first identification code and the second identification code is switched to the other thereof, the second value being larger than the first value.

18. The object detection device according to claim 14, wherein the drive control unit is configured to control the drive current or the drive voltage used by the drive unit for driving the wave transceiver unit to correct a change in a characteristic of the wave transceiver unit.

* * * * *